(12) United States Patent
Fernandez

(10) Patent No.: US 10,836,948 B2
(45) Date of Patent: Nov. 17, 2020

(54) ACTIVATORS FOR USE IN THE VISCOSIFICATION OF NON-AQUEOUS FLUIDS

(71) Applicant: Jorge M. Fernandez, Lake Charles, LA (US)

(72) Inventor: Jorge M. Fernandez, Lake Charles, LA (US)

(73) Assignee: Sasoi Performance Chemicals GmbH, Hamburg (DE)

(*) Notice: Subject to any disclaimer, the term of this patent is extended or adjusted under 35 U.S.C. 154(b) by 277 days.

(21) Appl. No.: 14/438,009

(22) PCT Filed: Oct. 29, 2013

(86) PCT No.: PCT/US2013/067165
§ 371 (c)(1),
(2) Date: Apr. 23, 2015

(87) PCT Pub. No.: WO2014/070692
PCT Pub. Date: May 8, 2014

(65) Prior Publication Data
US 2015/0291872 A1    Oct. 15, 2015

Related U.S. Application Data

(60) Provisional application No. 61/719,753, filed on Oct. 29, 2012.

(51) Int. Cl.
*C09K 8/32* (2006.01)
*C09K 8/64* (2006.01)
(Continued)

(52) U.S. Cl.
CPC .............. *C09K 8/32* (2013.01); *C09K 8/64* (2013.01); *C09K 8/82* (2013.01); *E21B 7/00* (2013.01); *E21B 43/04* (2013.01); *E21B 43/26* (2013.01)

(58) Field of Classification Search
CPC .... C09K 8/32; C09K 8/64; C09K 8/82; E21B 43/04; E21B 43/26; E21B 7/00
See application file for complete search history.

(56) References Cited

U.S. PATENT DOCUMENTS 2,531,427 A    11/1950  Hauser
2,966,506 A    12/1960  Jordan
(Continued)

FOREIGN PATENT DOCUMENTS

WO    WO99/50370       10/1999
WO    WO2012/106336    8/2012
WO    WO2013/154435    10/2013

OTHER PUBLICATIONS

Schlumberger Oilfield Glossary, definition of "Organophilic Clay", 1 page, printed Aug. 6, 2018 (Year: 2018).*

*Primary Examiner* — Alicia Bland
(74) *Attorney, Agent, or Firm* — Bushman Werner, P.C.

(57) ABSTRACT

A composition for viscosifying a nonaqueous base liquid. The composition has an alkoxylated alcohol having the general formula:

X—O—$(C_nH_{2n}O)_y$—$(C_2H_4O)_z$—H wherein X is an organyl group having from 3 to 40 carbon atoms, n is 2, 3 or 4, y is 0 to 6, and z is 3-20, and an organophilic clay. The base liquid is an oleaginous liquid which is liquid at 25° C. and is substantially immiscible in water.

17 Claims, 3 Drawing Sheets

(51) Int. Cl.
   *C09K 8/82* (2006.01)
   *E21B 7/00* (2006.01)
   *E21B 43/04* (2006.01)
   *E21B 43/26* (2006.01)

(56) References Cited

U.S. PATENT DOCUMENTS

| | | | |
|---|---|---|---|
| 4,105,578 A | | 8/1978 | Finlayson et al. |
| 4,208,218 A | | 6/1980 | Finlayson |
| 4,775,653 A | | 10/1988 | Leach et al. |
| 4,828,723 A | | 5/1989 | Cao et al. |
| 4,876,030 A | * | 10/1989 | Dixon .................. C09D 17/004 106/287.17 |
| 5,220,077 A | | 6/1993 | Sandoval et al. |
| 5,627,121 A | | 5/1997 | Lin et al. |
| 6,620,769 B1 | | 9/2003 | Juppe et al. |
| 8,329,609 B2 | | 12/2012 | Matheson et al. |
| 2001/0021724 A1 | | 9/2001 | Arcuri et al. |
| 2005/0087341 A1 | * | 4/2005 | McCabe .................. C09K 8/64 166/278 |
| 2006/0254770 A1 | * | 11/2006 | Hou .................. C09K 8/40 166/291 |
| 2008/0171670 A1 | * | 7/2008 | Cowan .................. C09K 8/035 507/206 |

* cited by examiner

ACTIVATORS FOR USE IN THE VISCOSIFICATION OF NON-AQUEOUS FLUIDS

CROSS REFERENCE TO RELATED APPLICATION

This application is a national phase application of PCT/US13/67165, filed Oct. 29, 2013, which in turn claims priority to U.S. Application No. 61/719,753 filed on Oct. 29, 2012, the disclosures of which are incorporated herein by reference for all purposes.

BACKGROUND OF THE INVENTION

Field of the Invention

The present invention relates to the viscosification of non-aqueous fluids including organophilic clays and more particularly to the viscosification of wellbore fluids. In particular, the invention relates to an activator for use in exfoliating organophilic clays used in various applications, e.g., wellbore fluids.

Description of Prior Art

Organophilic clays are widely used as rheological control agents in a wide variety of solvent systems. In particular, organophilic clays have found wide usage in wellbore fluids, usage in operations related to the development, completion and production of natural hydrocarbon reservoirs. Typical examples of such operations include drilling, fracturing subterranean formations, modifying the permeability of subterranean formations, logging operations, sand control, packer fluids, etc.

In particular, in deep well drilling, the use of organophilic clays in oil-based muds have certain advantages despite their considerably higher initial cost. The advantages of oil-based fluids are apparent in water-sensitive formations, e.g., swelling shale, insoluble salt formations, and at high temperatures. These fluids are also used for drill stem lubrication, particularly in drilling curved or deviated wells, for corrosion protection and they have the further advantage of being reusable.

One of the primary functions of organophilic clays in oil-based wellbore fluids, as well as water based formulation, is to act as viscosifiers. However, it is well known that for organophilic clays to swell in or viscosify a non-aqueous wellbore fluid they must first be exfoliated. This is usually accomplished with small amounts of polar molecules as activators. Typical activators for use with clay-type thixotropic viscosifying agents such as organophilic clays include water, ethanol, methanol, glycols, sodium silicate, sodium fluoride, magnesium silico fluoride, calcium carbonate, polar aprotic compounds, etc. An especially preferred and widely used activator is propylene carbonate.

SUMMARY OF THE INVENTION

In one aspect, the present invention provides an activator for use with organophilic clays in non-aqueous fluids, particularly non-aqueous wellbore fluids.

In another aspect, the present invention provides a viscosifying package for use in non-aqueous fluids.

In still another aspect, the present invention provides a wellbore fluid comprised of a non-aqueous fluid, e.g., a hydrocarbon based fluid, an organophilic clay and an alkoxylated alcohol.

In yet another aspect, the present invention provides a method of treating a wellbore.

These and further features and advantages of the present invention will become apparent from the following detailed description, wherein reference is made to the figures in the accompanying drawings.

DETAILED DESCRIPTION OF PREFERRED EMBODIMENTS

Figure 1:
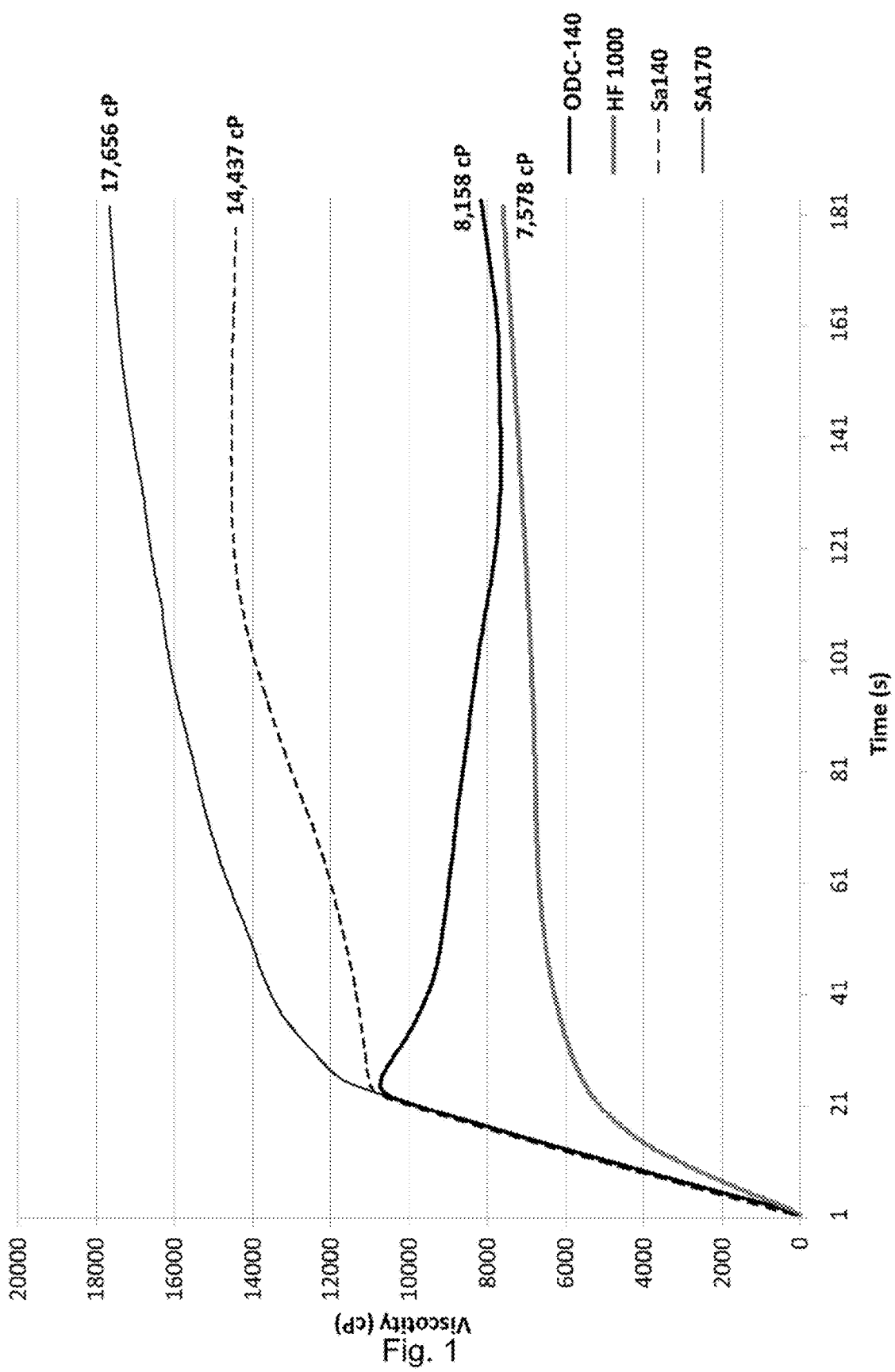
FIG. 1 is a graph depicting the viscosities of various solvents containing activator NOVEL 8-6.

The term "wellbore fluid" or similar terms refers to any fluid which is used in any phase of the exploration, drilling or production of oil and/or gas from subterranean formations.

The activators of the present invention are alkoxylated alcohols or blends of alkoxylated alcohols having the general formula:

$$X-O-(C_nH_{2n}O)_y-(C_2H_4O)_z-H \quad\quad I$$

wherein X is an organyl group having from 3 to 40 carbon atoms, n is 2, 3, or 4, y is 0 to 6, and z is 3-20.

An organyl group is defined as any organic substituent which is the residue of the alcohol and can have other substituent groups, e.g., —OH, NH2-, Cl, etc.

In a preferred embodiment, the activators of the present invention are alkoxylated alcohols or blends of alkoxylated alcohols having the general formula:

$$CH_3(C_xH_{2x})-O-(C_nH_{2n}O)_y-(C_2H_4O)_z-H \quad\quad II$$

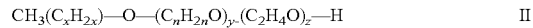

wherein x is from 3 to 31, n is 2, 3 or 4, y is 0 to 6, and z is 3-20.

The alkoxylated alcohols can be made by any method well known by those skilled in the art. The following U.S. Patents teach such methods: U.S. Pat. Nos. 8,329,609, 5,627,121, 5,220,077, and 4,775,653, all of which are incorporated herein by reference for all purposes.

As a general rule, the efficacy of the alcohol alkoxylates useful in the present invention can be estimated by the hydrophilic-lipophilic balance (HLB) value of the particular alkoxylate. As is well known, the HLB of alkoxylated alcohols can be estimated as the weight percent of the alkoxylated portion of the molecule divided by 5, as taught by Rosen, Milton, J. and Kunjappu, Joy T., "Surfactants and Interfacial Phenomena" John Wiley & Sons, Fourth Edition 2012, page 357. Accordingly, for an ethoxylate having the generic formula:

$$CH_3(CH_2)_x-O-(CH_2CH_2O)_n-H$$

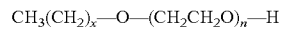

the HLB can be roughly calculated as follows:

$$HLB=100.44n/(5-(32+14x+44n))$$

Generally speaking, HLB of the alcohol alkoxylates useful in the present invention will be from about 8 to about 16, an HLB of from about 12 to about 15 being preferred.

The alcohols or blends of alcohols useful in the alcohol alkoxylates of the present invention include, without limitation C6 alcohol, C8 alcohol, C8-C10 linear alcohol, C10-C12 linear alcohol, C12-C13 oxo-alcohol, isotridecyl alcohol, 2-ethyl-hexanol, 2-propyl-heptanol, 2-butyl-octanol, 2-hexyl-decanol, 2-octyl-dodecanol, 2-decyl-tetradecanol, 2-dodecyl-hexadecanol, linear primary alcohols, and both linear and/or branched secondary alcohols. Particularly preferred are branched alcohols having from 4 to 32 carbon atoms.

The base oils or fluids which can be used in the compositions of the present invention include but are not limited to oleaginous liquids. As used herein, the term "oleaginous liquid" means a hydrocarbon or an oil which is a liquid at 25° C. and is substantially immiscible in water. Oleaginous liquids suitable for use herein typically includes substances such as diesel oil, mineral oil (including lower aromatic content mineral oils), synthetic oils such as Fischer-Tropsch (FT) derived hydrocarbons, polyolefins or isomerized polyolefins, ester oils, glycerides of fatty acids, aliphatic esters, aliphatic ethers, aliphatic acetyls, or other such hydrocarbons and combinations of these fluids. Particularly preferred are hydrocarbon liquids which are primarily linear, especially such hydrocarbon liquids derived from a process involving a FT reaction, e.g., gas-to-liquid (GTL) process. In general, it is preferred that the base oil of the present invention have a relatively low aromatic content, e.g., less than about 2% aromatics by weight. Table 1 shows various base oils which can be used.

TABLE 1

|  | Petroleum derived | Synthetic | Linear paraffin | iso paraffin | Olefin | Ester | Description |
|---|---|---|---|---|---|---|---|
| Diesel | X |  |  |  |  |  | off-road diesel #2 |
| ODC Oil | X |  |  | X |  |  | hydrogenated kerosene raffinate ca. 140° F. flash point |
| LPA 170 | X |  |  | X |  |  | hydrogenated kerosene raffinate ca. 170° F. flash point |
| LINPAR 14-16V | X |  | X |  |  |  | linear paraffin |
| HF-1000 | X | X |  | X |  |  | process stream of LPA-170 with olefin and ester byproducts |
| ODC FT-170 |  | X | X | X |  |  | distilled Fischer-Tropsch diesel |
| IO 16-18 |  | X |  |  | X |  | 16-18 internal olefin (Chevron-Phillips) |
| OMC-586 XL |  | X |  |  |  | X | Ester (Emerys Oleochemical) |
| ShellSol D80 | X |  | X | X |  |  | Shell Chemicals |
| ESCAID 110 | X |  | X | X |  |  | Exxon Mobile |

The organophilic clay can be any available thixotropic viscosifying agent for organic liquids. Suitable organophilic clays include the reaction products of smectite-type, hectorite clays, or other clays and organic cations, i.e., quaternary ammonium cations (sometimes referred to as organophillic clay gellants); smectite clays; kaolin clays; and the like. The preferred organophilic clays used as a thixotropic viscosifying agent, in accordance with one aspect of the present invention, is a smectite-type clay that is selected from the group consisting of bentonite, hectorite, montmorillonite, nontronite, biedellite, saponite, stevensite, and mixtures thereof, most preferably bentonite or hectorite. The preferred quaternary ammonium cations, in the event that the clay used is the reaction product of a clay and a quaternary ammonium compound, are selected from the group consisting of methyl trihydrogenated tallow ammonium, dimethyl dehydrogenated tallow ammonium, dimethyl benzyl hydrogenated tallow ammonium, methyl benzyl dehydrogenated tallow ammonium, and mixtures thereof. Exemplary organoclays and clay gellants suitable for use with the compositions described herein are set forth in the following U.S. patents, all incorporated herein by reference in relevant part: U.S. Pat. Nos. 2,531,427; 2,966,506; 4,105,578; and 4,208,218. Exemplary, commercially available organophilic clays suitable for use with the compositions described herein are CLAYTONE® IMG 400 Claytone ER, Claytone EM, and Claytone II, available from Southern Clay Products, Inc., Gonzalez, Tex., U.S.A., or Bentone 34, Bentone 150 and BENTONE® 38 Organoclay (a commercial hectorite-based product, available form a number of suppliers).

Tables 2 and 3 below show the effect of the HLB of typical alcohol ethoxylates in compositions containing a non-aqueous base fluid ODC FT-140 (GTL diesel) and an organophilic clay marketed as Claytone II by Southern Clay Products.

TABLE 2

| Hydrophobe | Moles of EO | HLB | Static aging for 16 hours at room temp. | Peak Viscosity[1] (cP) |
|---|---|---|---|---|
| NOVEL23[2] | 2 | 6.3 | separation | 0 |
| NOVEL23 | 4 | 9.5 | separation | 0 |

TABLE 2-continued

| Hydrophobe | Moles of EO | HLB | Static aging for 16 hours at room temp. | Peak Viscosity[1] (cP) |
|---|---|---|---|---|
| NOVEL23 | 7 | 12.3 | homogenous | n/a |
| NOVEL23 | 9 | 13.4 | homogenous | 18,579 |
| NOVEL23 | 12 | 14.6 | separation | 5,379 |
| NOVEL23 | 40 | 18.0 | complete separation | 0 |

[1]As measured by Brookfield LVDV II + Pro Viscometer.
[2]$C_{12}$-$C_{13}$ alcohol ethoxylate marketed by Sasol North America, Inc.

TABLE 3

| Hydrophobe | Moles of EO | HLB | Static aged for 16 hours at room temp. | Peak Viscosity[2] (cP) |
|---|---|---|---|---|
| NOVEL 6[3] | 2 | 9.3 | homogenous | 14,597 |
| NOVEL 6 | 4 | 12.7 | homogenous | 18,896 |
| NOVEL 6 | 6 | 14.4 | thick and homogenous | 26,994 |
| NOVEL 6 | 9.5 | 16.1 | separation | 0 |
| NOVEL 6 | 12 | 16.8 | separation | 0 |
| NOVEL 6 | 12* | 16.8 | complete separation | 0 |

[3]$C_6$ alcohol ethoxylate marketed by Sasol North America, Inc.

Tables 2 and 3 demonstrate that at least for the alcohol ethoxylates shown, in this particular system of base fluid, organophilic clay type, and temperature, an HLB of from about 12 to about 15 is preferred.

The viscosifying package of the present invention comprises the activating agent and an organophilic clay, both as described above. Generally speaking, the activators of the present invention will be present in the viscosifying package in an amount of from about 30 wt % to about 50 wt % based on the organophilic clay, the organophilic clay being present in an amount of from 50 wt % to 70 wt %. When the viscosifying package is present in a wellbore fluid, it will be in an amount of from about 0.2 to about 4.0 wt % of the wellbore fluid.

Table 4 below shows the effect of various alcohol ethoxylates in compositions containing a non-aqueous base fluid LPA-170 marketed by Sasol North America, Inc. and an organophilic clay marketed as Claytone II by Southern Clay Products.

TABLE 4

| ALCOHOL | MOLES EO | PEAK VISCOSITY (CP) |
|---|---|---|
| NOVEL 6 | 2 | 0 |
| NOVEL 6 | 4 | 11747.636 |
| NOVEL 6 | 6 | 0 |
| NOVEL 6 | 12 | 29369.09 |
| NOVEL 23 | 5 | 0 |
| NOVEL 23 | 9 | 17621.454 |
| NOVEL 23 | 15 | 5873.818 |
| NOVEL TDA[4] | 12 | 35242.908 |
| N810[5] | 2 | 0 |
| N810 | 4.5 | 0 |
| N1012[6] | 9 | 0 |
| ISALCHEM 123[7] | 9 | 0 |
| ALFONIC TDA[8] | 9 | 35242.908 |
| PPC/NOVEL 6 (80/20)[9] | 12 | 29369.09 |
| PPC/NOVEL 6 (50/50) | 12 | 35242.908 |
| PPCT/NOVEL 6 (80/20) | 12 | 64,612 |
| ISOFOL 12[10] | 9 | 29369.09 |
| LIAL 123[11] | 12 | 11747.636 |

[4]$C_{13}$ isotridecyl alcohol ethoxylate - NOVEL catalyst, sold by Sasol North America, Inc.
[5]$C_8$-$C_{10}$ Ziegler linear alcohol ethoxylate, sold by Sasol North America, Inc.
[6]$C_{10}$-$C_{12}$ Ziegler linear alcohol ethoxylate, sold by Sasol North America, Inc.
[7]$C_{12}$-$C_{13}$ Oxo-alcohol ethoxylate >90% branching, sold by Sasol North America, Inc.
[8]$C_{13}$ isotridecyl alcohol ethoxylate - ALFONIC catalyst, sold by Sasol North America, Inc.
[9]Blend of polypropylene carbonate and $C_6$ alcohol ethoxylate
[10]$C_{12}$ Guerbet alcohol ethoxylate sold by Sasol North America, Inc.
[11]$C_{12}$-$C_{13}$ Oxo-alcohol ethoxylate - ca. 50% branching, sold by Sasol North America, Inc.
[12]C8 alcohol ethoxylate having 6 moles of ethoxylate, sold by Sasol North America, Inc.
[13]$C_{10}$-$C_{12}$ Ziegler linear alcohol ethoxylate sold by Sasol North America, Inc.
[14]$C_{12}$-$C_{13}$ alcohol ethoxylate marketed by Sasol North America, Inc.

Table 4 shows that different activators have different effectiveness in different solvents. Thus the activator should be tailored to fit the solvent in question. The following non-limiting examples further demonstrate the invention.

Example 1

In Example 1, 1.5 mL of the activator NOVEL 8-6[12] was mixed into 100 mL of solvent at slow speed. The four solvents tested were low-temperature Fischer-Tropsch (LTFT) Distillate ODC-140, LTFT Distillate SA-140, LTFT Distillate SA-170, and HF-1000 Blend. After mixing, 3.0 grams of organophilic clay Claytone II was added. The mixer rheostat was increased to 100 and the mixture was mixed for 20 minutes. The clay was stored in a glass jar overnight. After ambient static aging for 16 hours, any separation or settling was noted and the mixture was rehomogenized for 30 seconds. The low-shear rate viscosity was then measured using the appropriate spindle at 0.3 rpm for 3 minutes. The results are shown in FIG. 1. As shown, NOVEL 8-6 achieved the highest viscosity with SA 170.

Example 2

Figure 2:
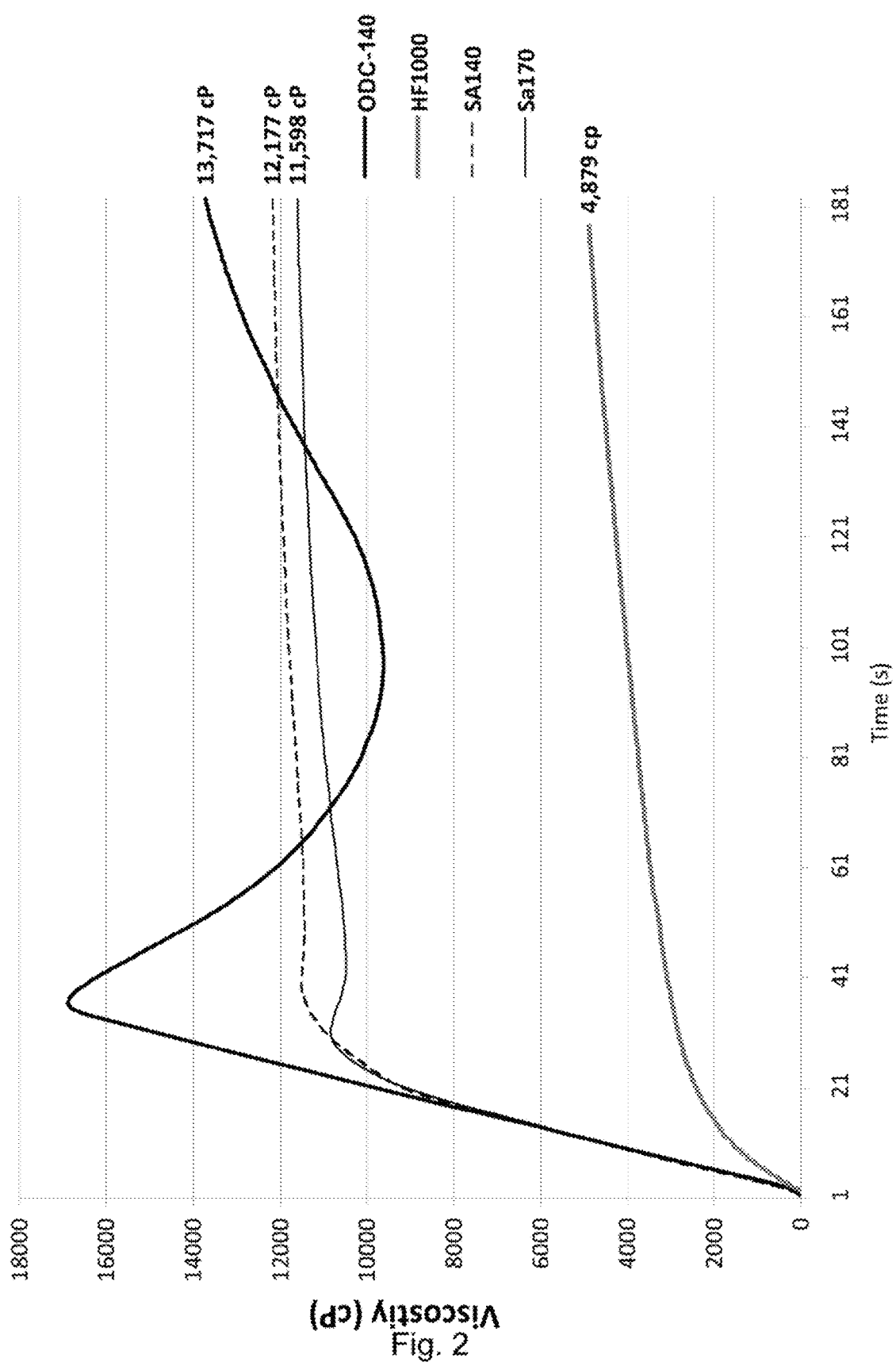
FIG. 2 is a graph similar to FIG. 1, but using activator NOVEL 1012-9.

The experiment of Example 1 was repeated, but the activator used was NOVEL 1012-9[13]. The results are shown in FIG. 2 and indicate that the highest viscosity was achieved with the ODC-140 sample.

Example 3

Figure 3:
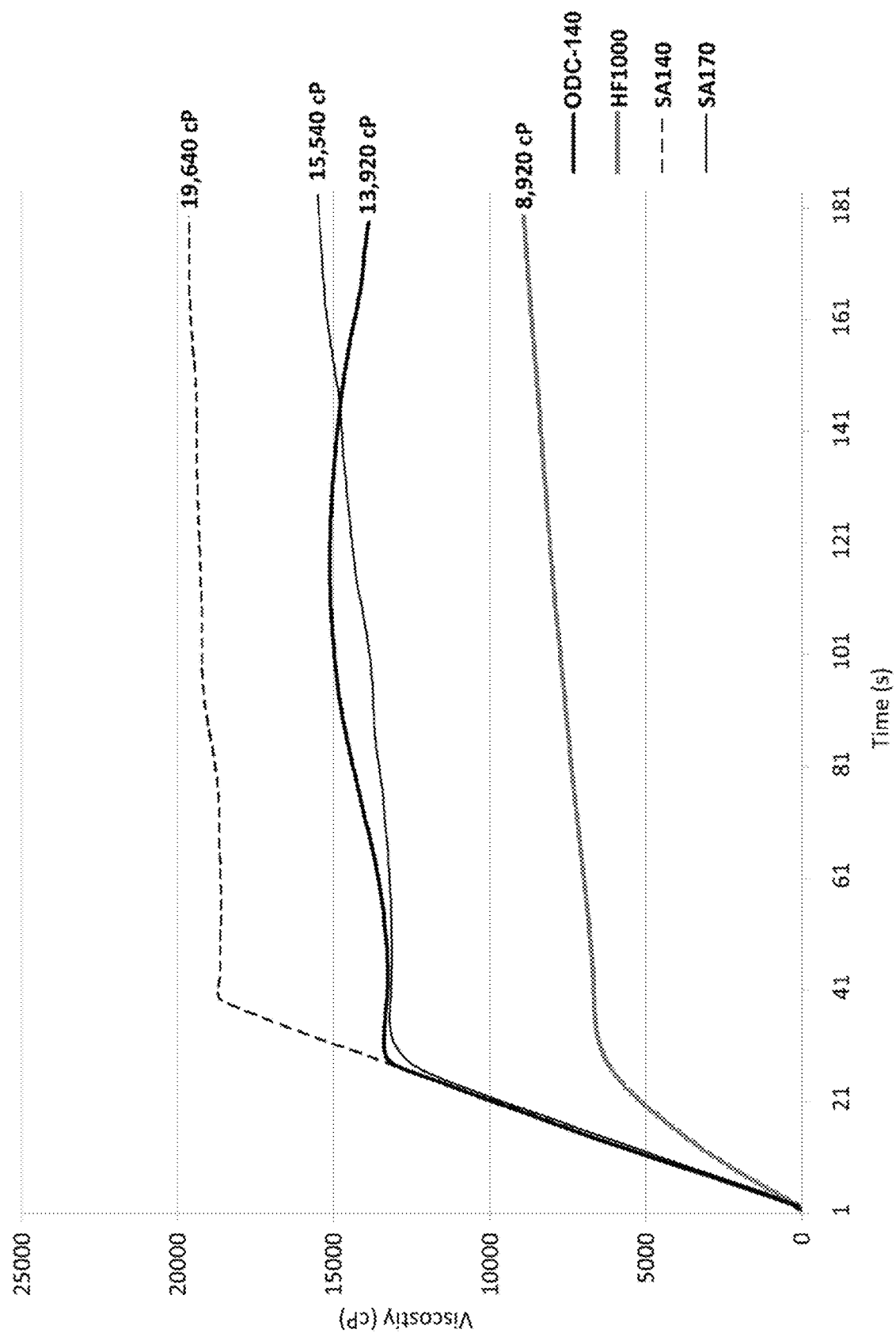
FIG. 3 is a graph similar to FIG. 1, but using activator NOVEL 23-9.

The experiment of Example 1 was repeated, but the activator used was NOVEL23-9[14]. The results are shown in FIG. 3 and indicate that the highest viscosity was achieved with SA-140.

In the experiments above, all three activators achieved an increase in viscosity of the organophilic clay, but each was best suited for a particular solvent. Thus the selection of the activator of the present invention can be tailored for optimal performance with the solvent.

While reference is made above to the base composition of the present invention as being non-aqueous, it is to be understood that in certain cases the addition of a small amount of water as a co-activator can further enhance the suspending characteristics of the resulting organophilic clay suspension medium. When used, water will generally be present in the composition in an amount from about 30 wt % to about 50 wt % based on the organophilic clay.

While in the above description, reference is made to the use of the activators of the present invention in conjunction with organophilic clays used in wellbore fluids, it will be understood that the invention is not so limited. As well known to those skilled in the art, activated, organophilic clays are well known for their gelling and viscosity increasing ability in organic liquids of many types. Thus, in addition to wellbore fluids, e.g., drilling fluids, they find wide usage in paints, greases, and fiberglass resins. They may also be used in cosmetics, inks, and polishes.

It will be recognized that, when used as a wellbore fluid, the composition of the present invention may contain certain ingredients or additives tailored to the specific use in the wellbore fluid. Thus, for example if the wellbore fluid was a sealing composition for sealing off subterranean zones, water soluble clays, cross-linking agents, dispersing agents, cements, fillers and the like can also be employed. In the case of viscosity well treatment fluid compositions suitable for use in managed pressure drilling (MPD), the composition can also include emulsifiers, wetting agents, fluid loss control additives and weighing materials. Still further, as is well known, completion fluids are generally comprised of clear brines containing such material as ammonium chloride, sodium chloride, sodium bromide, etc. The compositions of the present invention could be used to improve dispersion of additives of the resulting completion fluids so that the suspended particles remain suspended for longer periods of time or at higher temperatures before being introduced into completion fluids. Fracturing fluids according to the present invention in addition to the viscosifying package can include proppants, certain polymeric materials and other ingredients. Methods of employing various wellbore fluids for certain purposes are well known to those skilled in the art and are also contemplated by the present invention. In general the wellbore fluids of the present invention can comprise an additive selected from the group consisting of emulsifiers, wetting agents, viscosifiers, weight agents, fluid loss control agents, proppants, and particulate agents for forming gravel packs.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A wellbore fluid, comprising:
   a synthetic oleaginous liquid which is liquid at 25° C., is substantially immiscible in water, has less than 2% aromatics, is primarily linear, and is derived from a process involving a Fischer Tropsch reaction;
   a viscosifying package comprising:
   an organophilic clay; and
   an alkoxylated alcohol having the general formula:

$$X-O-(C_nH_{2n}O)_y-(C_2H_4O)_z-H$$

wherein X is an organyl group having from 3 to 40 carbon atoms, n is 2, 3 or 4, y is 0 to 6, and z is 3-20, wherein said alkoxylated alcohol activates said organophilic clay, and wherein said alkoxylated alcohol has an HLB of from 12.3 to 14.6;
   said wellbore fluid having a viscosity of from 5,379 cP to 26,994 cP determined at room temperature.

2. The wellbore fluid of claim 1 wherein the alkoxylated alcohol has the general formula:

$$CH_3(C_xH_{2x})-O-(C_nH_{2n}O)_y-(C_2H_4O)_z-H$$

wherein x is from 3 to 31, n is 2, 3 or 4, y is 0 to 6, and z is 3-20.

3. The wellbore fluid of claim 1, wherein said alkoxylated alcohol is present in an amount of 30 wt % to 50 wt % based on the organophilic clay.

4. The wellbore fluid of claim 1, wherein said alkoxylated alcohol is made from a branched alcohol.

5. The wellbore fluid of claim 1, wherein said organophilic clay is a smectite-type clay that is selected from the group consisting of bentonite, hectorite, montmorillonite, nontronite, biedellite, saponite, stevensite, and mixtures thereof.

6. A wellbore fluid comprising:
   a synthetic oleaginous liquid which is liquid at 25° C., is substantially immiscible in water, is primarily linear and is derived from a process involving a Fischer Tropsch reaction;
   a viscosifying package comprising:
   an organophilic clay; and
   an alkoxylated alcohol having the general formula:

$$X-O-(C_nH_{2n}O)_y-(C_2H_4O)_z-H$$

wherein X is an organyl group having from 3 to 40 carbon atoms, n is 2, 3 or 4, y is 0 to 6, and z is 3-20, wherein said alkoxylated alcohol activates said organophilic clay and wherein said alkoxylated alcohol has an HLB of from 12.3 to 14.6;
   said wellbore fluid having a viscosity of from 5,379 cP to 26,994 cP determined at room temperature.

7. The wellbore fluid of claim 6 wherein the alkoxylated alcohol has the general formula:

$$CH_3(C_xH_{2x})-O-(C_nH_{2n}O)_y-(C_2H_4O)_z-H$$

wherein x is from 3 to 31, n is 2, 3 or 4, y is 0 to 6, and z is 3-20.

8. The wellbore fluid of claim 6, wherein the oleaginous liquid has less than 2% aromatics.

9. The wellbore fluid of claim 6, wherein said alkoxylated alcohol is present in an amount of 30 wt % to 50 wt % based on the organophilic clay.

10. The wellbore fluid of claim 6, wherein said alkoxylated alcohol and said organophilic clay are present in an amount of 0.2% to 4.0%, based on the wellbore fluid.

11. The wellbore fluid of claim 6, wherein said alkoxylated alcohol is made from a branched alcohol.

12. The wellbore fluid of claim 6, wherein said organophilic clay is a smectite-type clay that is selected from the group consisting of bentonite, hectorite, montmorillonite, nontronite, biedellite, saponite, stevensite, and mixtures thereof.

13. The wellbore fluid of claim 6, further comprising:
   water in an amount of 30 to 50% based on said organophilic clay.

14. A method of treating a wellbore comprising:
   introducing into the wellbore the composition of claim 1 and an additive comprising at least one of emulsifiers, wetting agents, viscosifiers, weighting agents, fluid loss control agents, proppants, and particulate agents for forming gravel packs.

15. The method of claim 14, wherein said method further comprises drilling a well.

16. The method of claim 14, wherein said method further comprises fracturing a well.

17. The method of claim 14, wherein said method further comprises forming a gravel pack.

* * * * *